(12) United States Patent
Clay (10) Patent No.: US 6,460,674 B1
(45) Date of Patent: Oct. 8, 2002

(54) CLUTCH FACE FINISH AND CLUTCH PACK UTILIZING SAME

(75) Inventor: Bruce A. Clay, Bartlett, IL (US)

(73) Assignee: Borgwarner, Inc., Troy, MI (US)

(*) Notice: Subject to any disclaimer, the term of this patent is extended or adjusted under 35 U.S.C. 154(b) by 0 days.

(21) Appl. No.: 09/814,523

(22) Filed: Mar. 22, 2001

(51) Int. Cl.$^7$ .............................................. F16D 13/00
(52) U.S. Cl. .................................. 192/70.14; 192/84.7
(58) Field of Search ..................... 192/70.14, 107 R, 192/107 M, 84.7; 188/218 XL (56) References Cited

U.S. PATENT DOCUMENTS

| | | | |
|---|---|---|---|
| 4,351,885 A | * 9/1982 | Depoisier et al. | 188/251 M |
| 5,029,686 A | * 7/1991 | Yesnik | 192/107 M |
| 5,048,654 A | * 9/1991 | Yesnik | 192/70.14 |
| 5,056,630 A | * 10/1991 | Fujii et al. | 188/218 XL |
| 5,078,248 A | * 1/1992 | Yesnik | 192/107 M |
| 5,176,236 A | 1/1993 | Ghidorzi | |
| 5,193,375 A | * 3/1993 | Meister | 188/218 R |
| 5,484,513 A | * 1/1996 | Dejneko et al. | 204/212 |
| 5,515,953 A | * 5/1996 | Tamura et al. | 188/250 G |
| 5,711,405 A | * 1/1998 | Tamehira | 192/26 |
| 6,095,693 A | * 8/2000 | Fujiwara | 192/41 R |
| 6,109,408 A | 8/2000 | Ikeda et al. | |
| 6,129,192 A | * 10/2000 | Jackel et al. | 192/70.17 |
| 6,158,561 A | 12/2000 | Sakai et al. | |
| 6,269,669 B1 | * 8/2001 | Matsubara et al. | 72/53 |

* cited by examiner

Primary Examiner—Christopher P. Schwartz
Assistant Examiner—Benjamin A Pezzlo
(74) Attorney, Agent, or Firm—Brinks Hofer Gilson & Lione; Greg Dziegielewski (57) ABSTRACT

Friction clutch plates have a first face exhibiting a surface finish of about Ra 0.5 to 0.9 and a second face having friction material secured thereto. The clutch plates are manufactured by rolling steel to a thickness of about 0.030 inches (0.76 mm) which exhibits a mill finish of about Ra 0.64 to 1.14. The rolled steel is then stamped to form circular clutch plate blanks. One surface is then smoothed, preferably by polishing, so that peaks and sharp points are flattened or removed. The resulting surface finish includes irregular relatively flat and smooth regions interspersed with and separating irregular recesses or pits and exhibits a surface finish of about Ra 0.5 to 0.9. Friction material is then secured to the opposite face of the clutch plates. The clutch plates are used in multiple plate friction clutch packs which are intended for use in dual clutch front and rear axle assemblies and motor vehicle transfer cases.

20 Claims, 6 Drawing Sheets

CLUTCH FACE FINISH AND CLUTCH PACK UTILIZING SAME

BACKGROUND OF THE INVENTION

The invention relates generally to clutch plates having a specific surface finish and more specifically to clutch plates adapted for use in multiple plate friction clutch packs wherein a mill finish is polished to produce a surface having irregular flat regions and irregular recessed regions.

Amongst motor vehicle manufacturers, two areas of vehicle dynamics are foci of constant study, engineering effort and product improvement. These two areas can broadly be denominated vehicle performance and occupant comfort. Occupant comfort within the context of vehicle dynamics generally addresses noise, vibration and harshness (NVH) issues. These design criteria are nowhere more subjects of concern than in vehicles with adaptive four-wheel drive systems where the complex power train, torque distribution device, control strategy and overall system operation create unique performance and control issues. Such adaptive vehicle drive systems operate under most conditions as two-wheel drive systems and automatically shift or adjust to four-wheel drive when certain operating conditions such as wheel slip or other anomalies are present.

In such systems, the commencement of four-wheel drive operation, typically achieved by engagement of a clutch disposed between the full-time or primary drive line and the part-time or secondary drive line, which transfers drive energy to the secondary drive line, must be carefully controlled so that its operation is unnoticeable to the vehicle driver. Competing with this design criteria for smooth, transparent clutch engagement is often the design preference to engage the clutch as quickly as possible in order to optimize vehicle control and slip regulation. Whether the clutch engages slowly or rapidly, such engagement must be smooth, linear and without grabbing, judder or other engagement phenomena which may be detected by the vehicle driver and passengers. The present invention is directed to a multiple plate friction clutch having improved engagement smoothness and torque through put for use in motor vehicle drive lines.

SUMMARY OF THE INVENTION

Friction clutch plates have a first face exhibiting a surface finish of about Ra 0.5 to 0.9 and a second face having friction material secured thereto. The clutch plates are manufactured by rolling steel to a thickness of about 0.030 inches (0.76 mm) which exhibits a mill finish of about Ra 0.64 to 1.14. The rolled steel is then stamped to form circular clutch plate blanks. One surface is then smoothed, preferably by polishing, so that peaks and sharp points are flattened or removed. The resulting surface finish includes irregular relatively flat and smooth regions interspersed with and separating irregular recesses or pits and exhibits a surface finish of about Ra 0.5 to 0.9. Friction material is then secured to the opposite face of the clutch plates. The clutch plates are used in multiple plate friction clutch packs which are intended for use in dual clutch front and rear axle assemblies and motor vehicle transfer cases.

Thus it is an object of the present invention to provide clutch plates or discs having a first friction material surface and a second clutch surface with roughness between Ra 0.5 and 0.9.

It is a further object of the present invention to provide a multiple plate clutch pack assembly having improved engagement characteristics.

It is a still further object of the present invention to provide a multiple plate friction clutch pack having plates or discs with a defined surface treatment separated by clutch friction material.

It is a still further object of the present invention to provide a multiple plate friction clutch pack wherein one surface of each clutch plate is a mill finish which is polished to define irregular flat regions and adjacent irregular recesses.

It is a still further object of the present invention to provide a multiple plate friction clutch pack for use in a motor vehicle drive line having clutch plates or discs with a surface finish of Ra 0.5 to 0.9.

Further objects and advantages of the present invention will become apparent by reference to the following description of the preferred embodiment and appended drawings wherein like reference numbers refer to the same component, element or feature.

DETAILED DESCRIPTION OF THE PREFERRED EMBODIMENT

Figure 1:
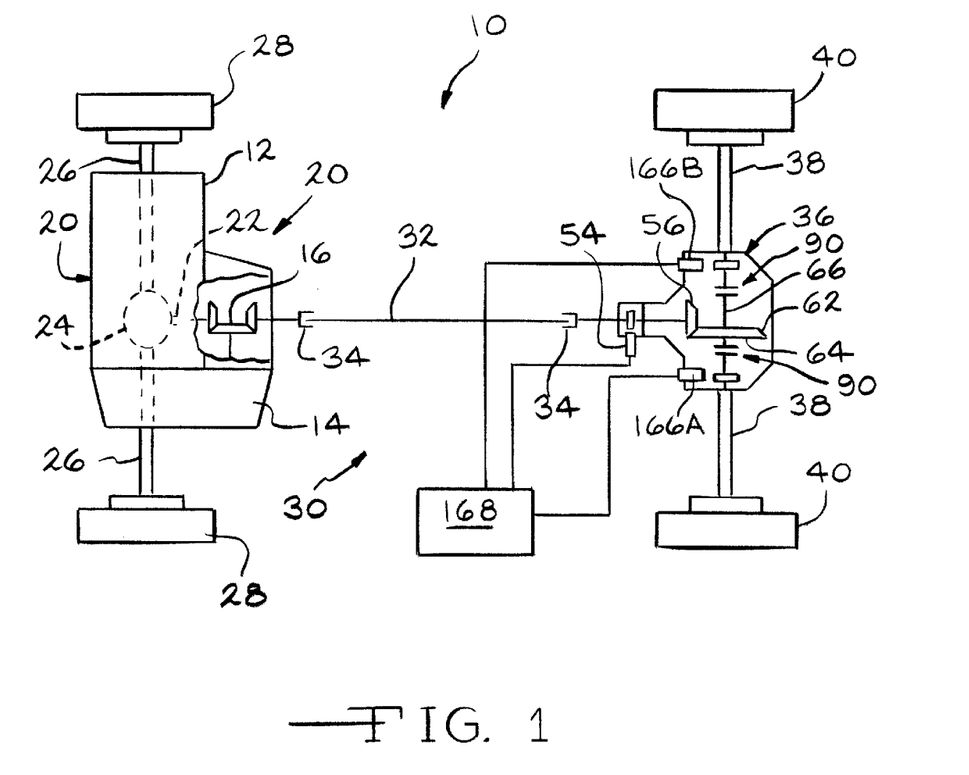
FIG. 1 is a diagrammatic view of a vehicle drive system including a twin clutch rear axle incorporating the present invention.

Referring now to FIG. 1, a four-wheel motor vehicle drive system is diagrammatically illustrated and designated by the reference number 10. The four-wheel vehicle drive system 10 includes a prime mover 12 such as a gasoline or Diesel engine which is coupled to and directly drives a transaxle 14. The output of the transaxle 14 drives a bevel or spiral bevel gear set 16 which provides motive power to a primary or front drive line 20 comprising a primary or front prop shaft 22, a primary or front differential 24, a pair of live primary or front axles 26 and a respective pair of primary or front tire and wheel assemblies 28. The bevel or spiral bevel gear set 16 also provides motive power to a secondary or rear drive line 30 comprising a secondary or rear prop shaft 32 having appropriate universal joints 34, a secondary or rear axle assembly 36, a pair of live secondary or rear axles 38 and a respective pair of secondary or rear tire and wheel assemblies 40.

Figure 2:
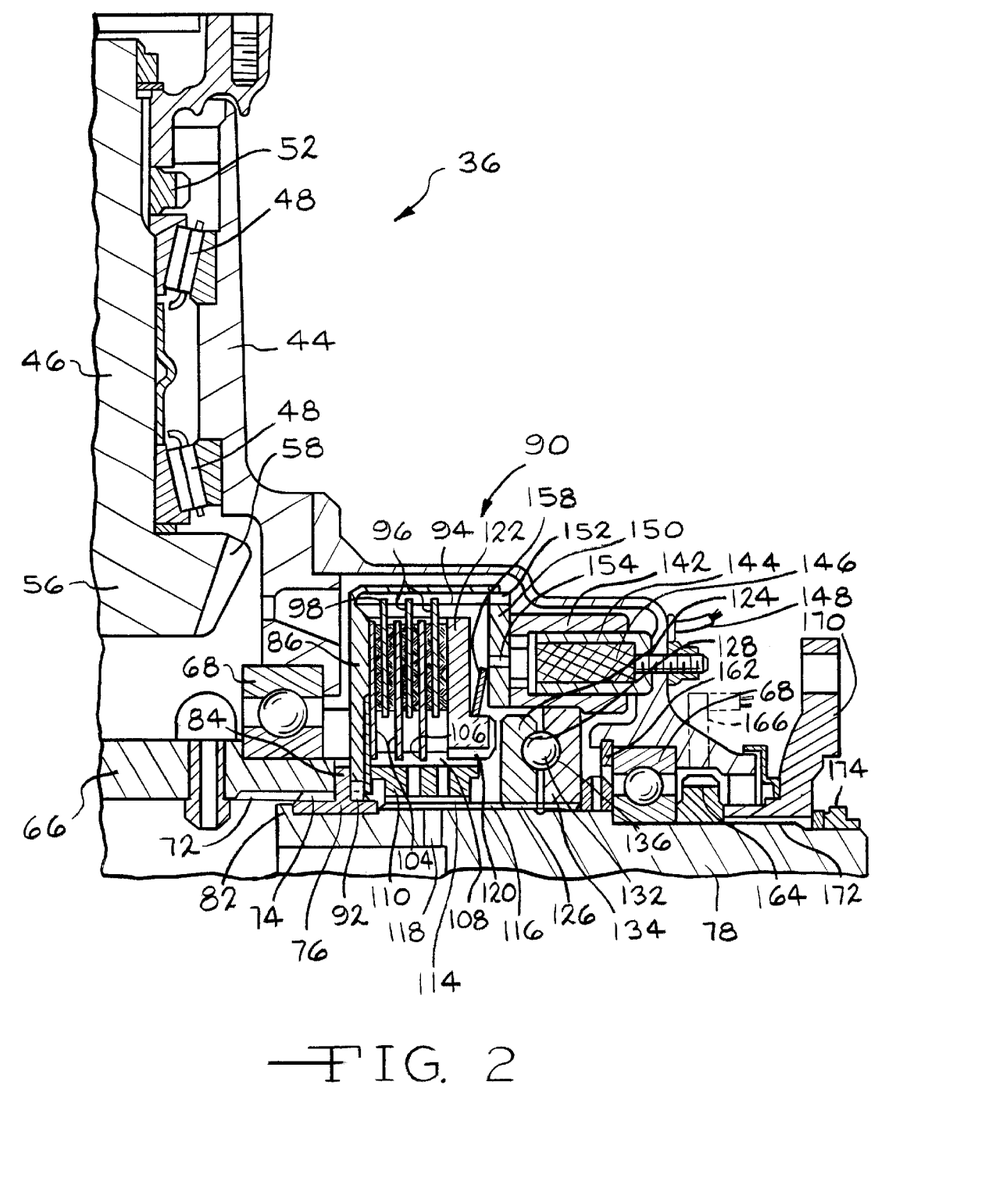
FIG. 2 is a fragmentary, full sectional view of a multiple plate clutch pack assembly and an electromagnetic ball ramp operator in a twin clutch axle.

Referring now to FIGS. 1 and 2, the rear axle assembly 36 includes a housing 44. The housing 44 receives a stub input shaft 46 which is rotatably supported in the housing 44 by a plurality of anti-friction bearing assemblies such as roller bearing assemblies 48. The stub input shaft 46 may includes a tone wheel 52 disposed operably adjacent a sensor 54 such as a variable reluctance or Hall effect sensor 54. The stub input shaft 46 may be integrally formed with and terminate in a bevel gear 56 having gear teeth 58 which mate with complementarily configured gear teeth 62 on a ring gear 64. The ring gear 64 is integrally formed with or secured to a cylindrical or tubular drive member 66. The tubular drive member 66 is supported by a pair of anti-friction bearings, such as ball bearing assemblies 68, one of which is illustrated in FIG. 2.

Figure 3:
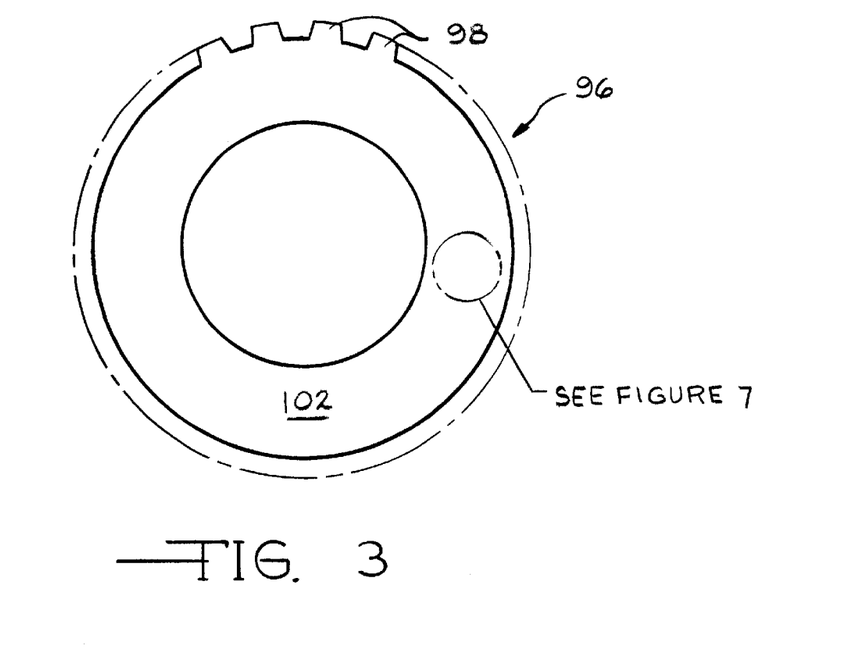
FIG. 3 is an elevational view of the front face of a first clutch plate according to the present invention.
Figure 4:
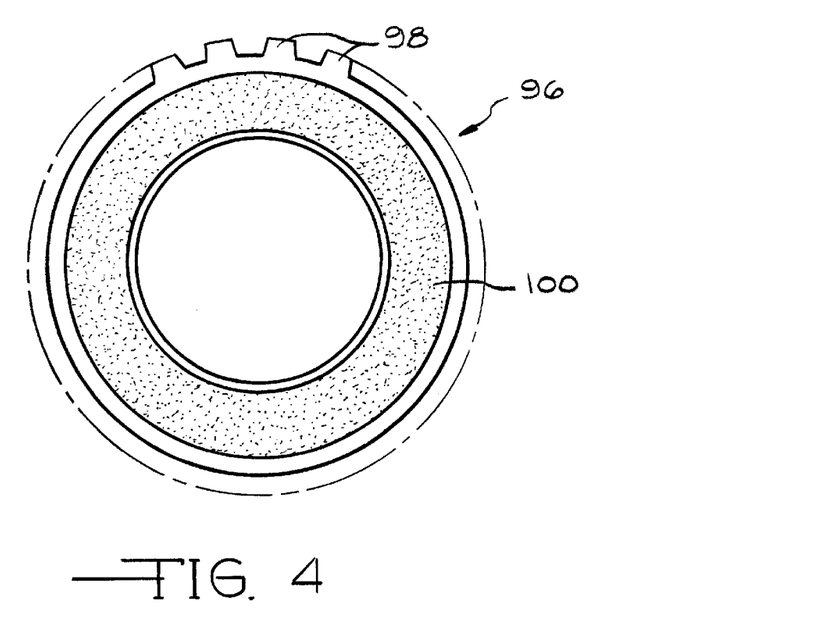
FIG. 4 is an elevational view of the back or rear face of the first clutch plate according to the present invention illustrating friction material.

The tubular drive member 66 includes female splines or gear teeth 72 which engage complementarily configured male splines or gear teeth 74 on a drive collar 76. The drive collar 76 is freely rotatably received upon a stub output shaft 78 but is restrained from axial movement to the left, as illustrated in FIG. 2, by a shoulder 82 on the end of the stub shaft 78. The drive collar 76 includes a flange 84 which is disposed between one end of the tubular drive member 66 and a portion of a bell-shaped drive housing 86 which is a component of an electromagnetic friction clutch assembly 90. It will be appreciated that the rear axle assembly 36 includes a pair, that is, a left and right, electromagnetic friction clutch assemblies which, independently and controllably provide drive torque to the rear axles 38. The bell-shaped drive housing 86 and the drive collar 76 include an interengaging male and female spline or gear set 92. Thus, rotation of the tubular drive member 66 is transmitted through the drive collar 76 to the bell housing 86. The bell housing 86 includes a plurality of axial female splines or gear teeth 94 which drivingly engage a first plurality of friction clutch plates or disks 96 having male splines 98 complementary to the female splines 94 within the bell housing 86. Thus, the first plurality of friction clutch plates or disks 96 rotate with the bell housing 86. As illustrated in FIGS. 2, 3 and 4, the first plurality of clutch plates or disks 96 include friction material 100 on one face and clutch faces or surfaces 102 on an opposite face.

Figure 5:
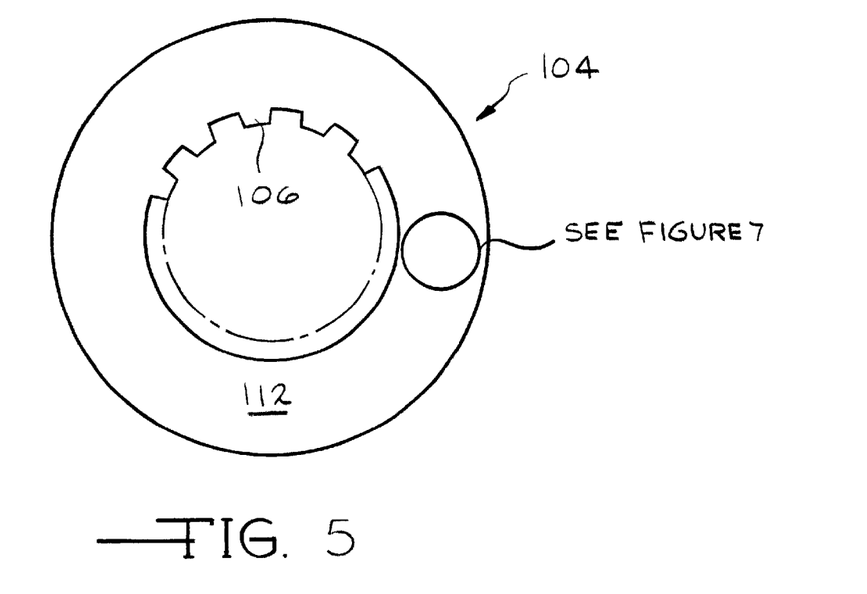
FIG. 5 is an elevational view of the front face of a second clutch plate according to the present invention.
Figure 6:
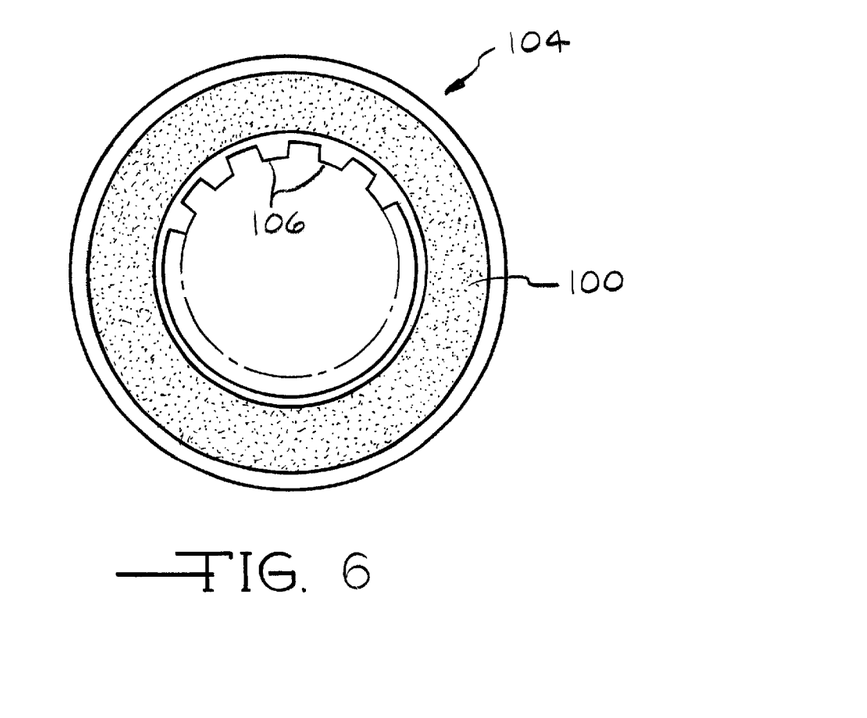
FIG. 6 is an elevational view of the back or rear face of the second clutch plate according to the present invention illustrating friction material.

Referring now to FIGS. 2, 5 and 6, interleaved with the first plurality of friction clutch plates or disks 96 are a second plurality of friction clutch plates or disks 104 having female splines or gear teeth 106 which mate with complementarily configured male splines or gear teeth 108 on a clutch hub 110. The second plurality of friction clutch disks 104 likewise include clutch faces or surfaces 112 and friction clutch material 100 on the opposite face. As illustrated in FIG. 2, the pluralities of friction clutch disks or plates 96 and 104 are arranged such that the plates 96 and 104 alternate with the friction clutch material 100 and form a friction clutch pack.

The clutch hub 110 includes female splines or gear teeth 114 which are complementary to and engage male splines or gear teeth 116 on the stub output shaft 78. The stub output shaft 78 and clutch hub 110 preferably include suitable axial and radial lubrication passageways 118 which facilitate circulation of a suitable cooling and lubricating fluid within the electromagnetic clutch assembly 90.

Splined to the clutch hub 110 and specifically to the male splines 108 by a set of complementarily configured female splines 120 is a circular apply plate 122. The apply plate 122 is acted upon by a first circular member 124 having female splines or gear teeth 126 which are complementary to the male splines or gear teeth 116 on the stub output shaft 78. The first circular member 124 includes a plurality of ramp-like first recesses 128 arranged in a circular pattern about the axis of the stub output shaft 78. The first recesses 128 represent an oblique section of a helical torus. Disposed within each of the first recesses 128 is a load transferring ball 132 or similar load transferring member which rolls along the ramps defined by the oblique surfaces of the first recesses 128. A second circular member 134 is disposed in opposed relationship with the first circular member 124 and includes a like plurality of complementarily sized, configured and arranged second recesses 136. The load transferring balls 132 are thus received and trapped within the pairs of opposing recesses 128 and 136, the ends of the recesses 128 and 136 being curved and much steeper in slope than the interior regions of the recesses 128 and 136 such that the load transferring balls 132 are retained in the regions defined thereby.

It will be appreciated that the recesses 128 and 136 as well as the load transferring balls 132 may be replaced with other, analogous mechanical elements which cause axial displacement of the circular members 124 and 134 in response to relative rotation therebetween. For example, tapered rollers disposed in complementarily configured conical helices may be utilized.

The second circular member 134 is secured by any suitable means such as welding, interengaging splines or an interference fit to an annular rotor 142 which defines a U-shape in cross-section. The annular rotor 142 is preferably fabricated of soft iron and substantially surrounds a coil housing 144 containing an electromagnetic coil 146. Electrical current is provided to the electromagnetic coil 146 through a single or double conductor cable 148. Disposed adjacent the face of the rotor 142 is a flat, circular armature 150. The armature 150 includes male splines or gear teeth 152 about its periphery which are complementary to and engage the female splines or gear teeth 94 on the interior of the bell housing 86. Thus, the armature 150 rotates with the bell housing 86. Both the rotor 142 and the armature 150 preferably include pluralities of arcuate, discontinuous banana slots 154 which direct and enhance the effect of the magnetic flux generated by the electromagnetic coil 146. A Belleville spring 158 is disposed between the armature 150 and the apply plate 122. When electrical energy is provided to the electromagnetic coil 146 through the cable 148, and a speed difference exists between the tubular drive member 66 and the stub output shaft 78, drag is created between the opposed faces of the rotor 142 and the armature 150, thereby creating a relative speed difference between the first and second circular members 124 and 134. Such a speed difference causes the load transferring balls 132 to ride up the ramps or recesses 128 and 136, separating the first and second circular members 124 and 134 and moving the apply plate 122 to the left, as illustrated in FIG. 2, compressing the pluralities of friction plates or disks 96 and 104 and transferring torque from the tubular drive member 66 to the stub output shaft 78.

Referring now to FIGS. 1 and 2, preferably, a thrust bearing 162 is disposed between the second circular plate 134 and one of the anti-friction bearings 68. A tone wheel 164 is secured to and rotates with the stub output shaft 78. A first axle sensor 166A which may be either a variable reluctance or Hall effect sensor 166 is disposed in sensing proximity with the tone wheel 164 and provides a signal representing the rotational speed of the stub output shaft 78. This signal, as well as a signal from a second axle sensor 166B and the sensor 54 are provided to a microprocessor 168. The microprocessor 168 may include software for conditioning such signals, computing rotational speeds, scaling such speeds, computing speed differences and providing outputs such as PWM (pulse width modulated) drive signals to the left and right electromagnetic friction clutch assemblies 90. An output flange 170 is preferably secured for rotation to the stub output shaft 78 through a set of interengaging splines 172 and is maintained there by a suitable nut 174 or other fastener.

Figure 7:
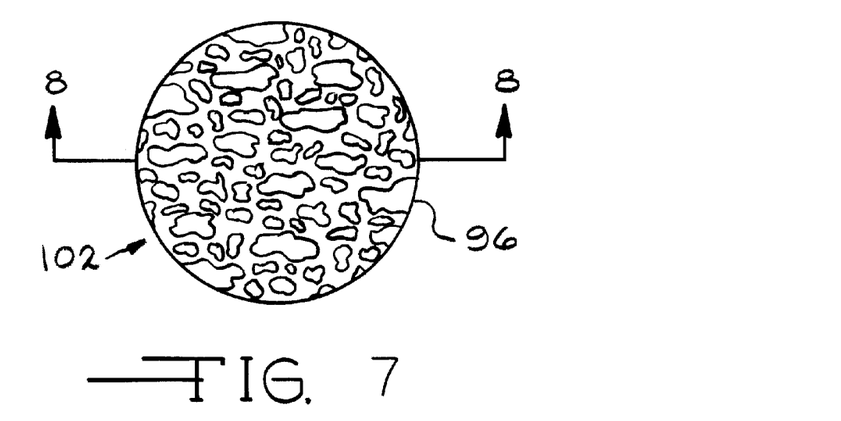
FIG. 7 is an enlarged view of the metal friction surface of a clutch plate according to the present invention.
Figure 8:
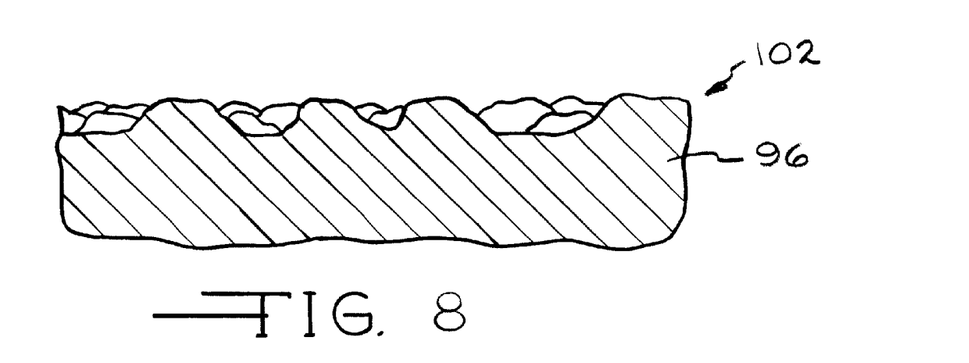
FIG. 8 is a highly enlarged, fragmentary sectional view of a clutch plate according to the present invention taken along line 8—8 of FIG. 7.
Figure 9:
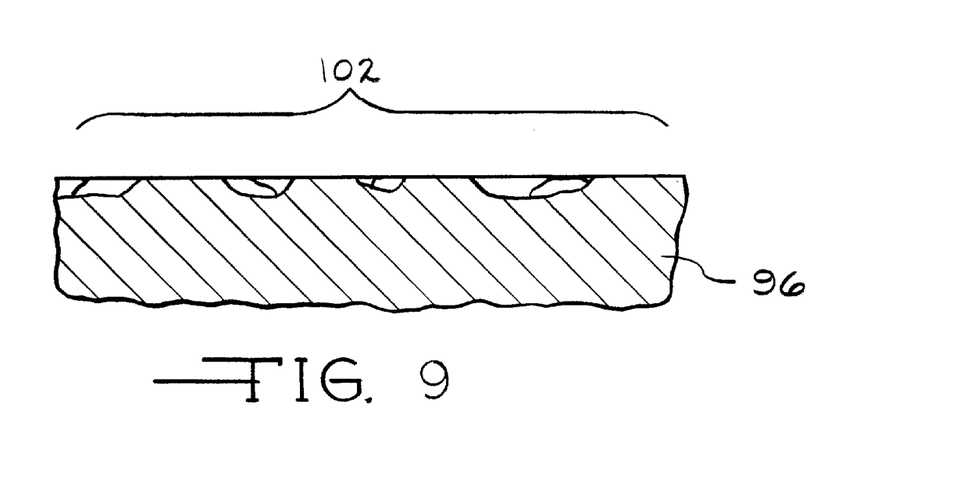
FIG. 9 is a highly enlarged, fragmentary sectional view of the finished clutch plate surface according to the present invention taken along line 8—8 of FIG. 7.

Turning then to FIG. 7, 8, 9, and 10, the configuration or finish of the faces or surfaces 102 and 1 12 of the clutch disks or plates 96 and 104, respectively, which engage friction material 100 and the manufacture thereof will now be described. A manufacturing facility 180 for the manufacture of such clutch disk or plates 96 and 104 is diagrammatically illustrated in FIG. 10. During manufacture, material, typically steel 182, is roll formed by a plurality of mill rollers 184 to the desired thickness, typically about 0.030 inches (0.76 mm) and more generally between about 0.025 inches (0.63 mm) to about 0.035 inches (0.89 mm). The mill rollers 184 of the forming operation produce a surface finish having a roughness of approximately Ra 0.64 to 1.14. This surface finish is illustrated in FIGS. 7 and 8, wherein FIG. 7 represents an enlarged plan view and FIG. 8 represents a highly enlarged, cross-sectional view. It will be appreciated that this initial surface finish is achieved by and is primarily a result of the surface irregularities or roughness of the mill rollers 184 which is reproduced or "printed" on the steel 182. The rolled steel 182 is then provided to a conventional reciprocating press 186. A plurality of clutch plate blanks 188 are formed, preferably by stamping or other analogous forming process, from the roll formed steel 182 in the reciprocating press 186. The clutch plate blanks 188 are carried from the press 186 by a conveyor 190.

After rolling, which achieves the surface finish described above and illustrated in FIGS. 7 and 8, and stamping which achieves the shapes illustrated in FIGS. 3, 4, 5 and 6, the clutch plate blanks 188 are then polished by a buffer or polisher 192. The polisher 192 preferably includes a coarse fiber pad 194 or similar relatively soft abrasive media typically including random weave fibers and binder which smoothes, buffs and polishes the surfaces 102 and 112 of the clutch blanks 188. "Relatively soft" as used herein refers to a comparison with conventional or typical metal working, i.e., grinding or polishing, media such as grinding wheels or other hard, abrasive media. So polished, the roughness of the surfaces 102 and 112 is approximately Ra 0.5 to 0.9.

Figure 10:
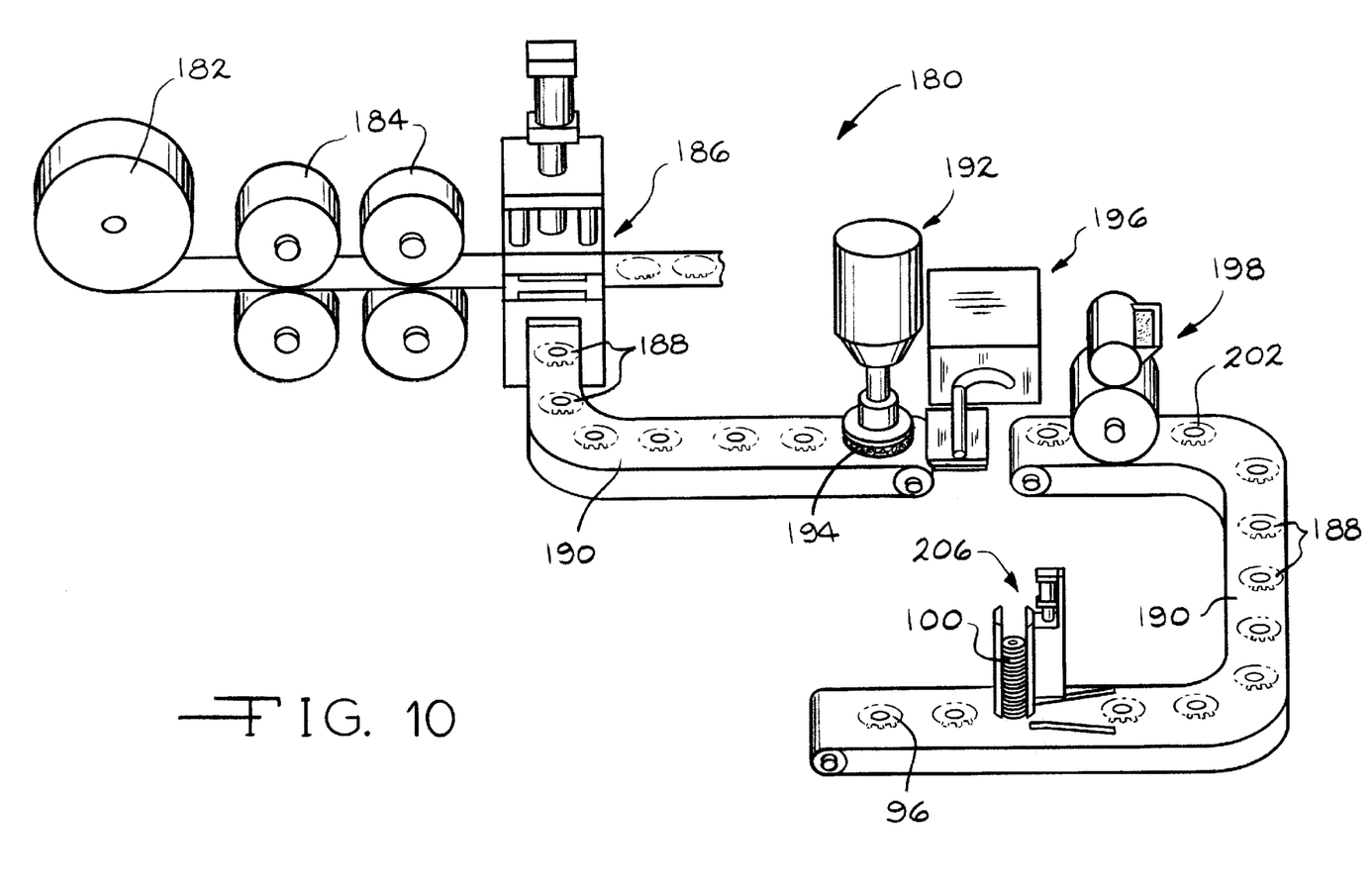
FIG. 10 is a diagrammatic view of a manufacturing facility for the production of clutch plates according to the present invention.

The polished clutch plate blanks 188 then continue along the conveyor 190 to a reversing mechanism 196 which flips the clutch blanks 188 so that the polished faces or surfaces 102 and 112 are face down. Then the clutch blanks 188 pass through a coating station 198 which applies an adhesive to an unpolished surface 202. The adhesive may be applied by rolling, spraying or other analogous process and to either the clutch blanks 188, as shown, or to the friction material 100. Finally, an annulus of friction material 100 is applied to the blanks 188 in an applying station 206. The clutch plates or disks 96 and 104 are now complete.

The clutch plates 96 and 104 manufactured according to the foregoing steps and including the above-described finish on the surfaces 102 and 112 exhibit both improved maximum torque throughput and quieter, smoother clutch engagement relative to clutches having other face treatments.

It has been found that surface finishes of less than about Ra 0.5 do not provide either suitable or improved torque transfer through a clutch such as the friction clutch assembly 90 and that surface finishes much above Ra 1.15 may contribute to premature failure of the friction material 100 due to the roughness of the surface.

While the complete mechanism of frictional coupling and thus improvement in torque throughput is not understood, it is believed that this roughness in the range of Ra 0.5 to Ra 0.9 represents a compromise or optimization between smoother surfaces or surface finishes which do not provide sufficient frictional coupling and rougher surfaces or surface finishes which result in premature degradation of the friction facing material.

Friction clutches such as the electromagnetic friction clutch assemblies 90 described above, incorporating the friction plates or discs 96 and 104 of the present invention, when utilized in motor vehicle drive line components such as dual clutch axles (both front and rear) and transfer cases, exhibit both improved maximum torque throughput and enhanced engagement characteristics, i.e., engagement which is smooth and without judder or other undesirable engagement phenomena.

The foregoing disclosure is the best mode devised by the inventor for practicing this invention. It is apparent, however, that devices and processes incorporating modifications and variations will be obvious to one skilled in the art of friction clutch components and their methods of manufacture. Inasmuch as the foregoing disclosure is intended to enable one skilled in the pertinent art to practice the instant invention, it should not be construed to be limited thereby but should be construed to include such aforementioned obvious variations and be limited only by the spirit and scope of the following claims.

I claim:

1. A friction clutch plate for a multiple plate friction clutch pack comprising, in combination,
    a flat, circular metal plate defining a first face, a second face and a centrally disposed opening,
    friction material disposed on said first face, and
    said second face having a plurality of irregular flat surfaces interspersed with a plurality of irregular recesses and having a surface roughness of Ra 0.5 to 0.9.

2. The friction clutch plate of claim 1 wherein said circular metal plate has an outer periphery defining a plurality of projecting teeth.

3. The friction clutch plate of claim 1 wherein said opening in said metal plate has an inner periphery defining a plurality of projecting teeth.

4. The friction clutch plate of claim 1 wherein said flat surfaces are formed by polishing.

5. The friction clutch plate of claim 1 wherein said recesses are formed by rolling.

6. The friction clutch plate of claim 1 wherein said friction plate is disposed for rotation with a first member and further including at least two additional friction plates flanking said friction plate and means to apply compressive force to said friction plates to transfer rotational energy between said members.

7. The friction clutch plate of claim 1 wherein said plate is made of steel having a thickness of less than about 0.035 inches.

8. A friction clutch pack assembly comprising, in combination,
    a first rotatable member,
    a second rotatable member, a first plurality of clutch plates disposed for rotation with said first rotatable member, a second plurality of clutch plates interleaved with said first plurality of clutch plates and disposed for rotation with said second rotatable member, an operator for applying compressive force to said interleaved pluralities of clutch plates, wherein said clutch plates include a first face having friction material and a second face having a plurality of irregular flat surfaces and a plurality of irregular recesses and a roughness of Ra 0.5 to 0.9.

9. The friction clutch pack assembly of claim 8 wherein said operator includes an electromagnetic coil and a cam mechanism for generating such compressive force.

10. The friction clutch pack assembly of claim 8 further including a second friction clutch pack assembly and a housing for receiving said clutch pack assemblies.

11. The friction clutch pack assembly of claim 10 further including a stub input shaft and a bevel gear set having an input driven by said input shaft and an output driving said friction clutch pack assemblies.

12. The friction clutch pack assembly of claim 10 further including a tone wheel and sensor operably associated with each of said friction clutch pack assemblies.

13. The friction clutch pack assembly of claim 8 wherein said rotatable members and said clutch plates include interengaging splines.

14. The friction clutch pack assembly of claim 8 wherein said clutch plates are less than about 0.035 inches thick.

15. A method of fabricating a friction plate for a multiple plate friction clutch, comprising the steps of:

providing a strip of rolled metal;

stamping such rolled metal into plates having a center opening;

polishing one face of such plates to create a surface having roughness of between Ra 0.5 to 0.9;

providing an adhesive to another face of such plates; and applying a layer of friction material to such another face.

16. The method of claim 15 wherein said stamped plates include radial splines.

17. The method of claim 15 wherein said metal is steel.

18. The method of claim 15 wherein said rolled metal has a surface roughness of Ra 0.64 to 1.14.

19. The method of claim 15 wherein such polishing is achieved by relatively soft media of fibers and binder.

20. The method of claim 15 wherein such polishing is achieved by a rotating pad of random weave fibers and binder.

* * * * *